US010852200B2

(12) United States Patent
Bramley

(10) Patent No.: US 10,852,200 B2
(45) Date of Patent: Dec. 1, 2020

(54) TEMPERATURE MEASURING APPARATUS AND A METHOD OF MEASURING TEMPERATURE

(71) Applicant: Metrosol Limited, Paulerspury (GB)

(72) Inventor: Paul Bramley, Paulerspury (GB)

(73) Assignee: Metrosol Limited, Paulerspury (GB)

(*) Notice: Subject to any disclaimer, the term of this patent is extended or adjusted under 35 U.S.C. 154(b) by 163 days.

(21) Appl. No.: 15/767,091

(22) PCT Filed: Nov. 29, 2016

(86) PCT No.: PCT/EP2016/079104
§ 371 (c)(1),
(2) Date: Apr. 9, 2018

(87) PCT Pub. No.: WO2017/097631
PCT Pub. Date: Jun. 15, 2017

(65) Prior Publication Data
US 2018/0299333 A1 Oct. 18, 2018

(30) Foreign Application Priority Data
Dec. 7, 2015 (GB) .................................. 1521503.1

(51) Int. Cl.
*G01K 7/00* (2006.01)
*G01K 15/00* (2006.01)
*G01K 7/30* (2006.01)
(52) U.S. Cl.
CPC ...................................... *G01K 7/30* (2013.01)
(58) Field of Classification Search
USPC ..................... 374/175, 183, 163, 1
See application file for complete search history.

(56) References Cited

U.S. PATENT DOCUMENTS 3,878,723 A * 4/1975 Blalock .................. G01K 7/30
374/175
3,890,841 A * 6/1975 Brixy ..................... G01K 1/024
374/175
(Continued)

FOREIGN PATENT DOCUMENTS

GB          1521503.1       12/2015

OTHER PUBLICATIONS

International Search Report for PCT/EP2016/079104 dated Jan. 12, 2017 (14 pages).
(Continued)

*Primary Examiner* — Mirellys Jagan
(74) *Attorney, Agent, or Firm* — Conley Rose, P.C.

(57) ABSTRACT

The present invention provides a system and method for measuring temperature accurately by measuring Johnson noise. The system comprising a Johnson noise generating resistive sensor element for detecting temperature; signal processing circuitry electrically coupled to the sensor element; and a current injector electrically coupled to the signal processing circuitry and the sensor element, and configured to inject a calibration current into the sensor element; wherein the signal processing circuitry is configured to: receive a composite voltage signal from the sensor element, the composite voltage signal including a voltage signal arising from the Johnson noise generated by the sensor element and a voltage signal arising from the calibration current; extract the Johnson noise voltage signal and the calibration voltage signal from the received composite voltage signal; and determine the temperature of the sensor element based on the extracted Johnson noise voltage signal and on the extracted calibration voltage signal.

21 Claims, 3 Drawing Sheets

(56) References Cited

U.S. PATENT DOCUMENTS

| | | | |
|---|---|---|---|
| 3,937,086 A * | 2/1976 | von Thuna | G01K 7/30 374/175 |
| 5,228,780 A * | 7/1993 | Shepard | G01K 7/30 374/175 |
| 5,746,511 A | 5/1998 | Eryurek et al. | |
| 2013/0022075 A1 | 1/2013 | Pape et al. | |

OTHER PUBLICATIONS

International Preliminary Report of Patentability for PCT/EP2016/079104 dated Oct. 26, 2015 (8 pages).

Callegaro, Luca, et al., "A Johnson noisethermometer with traceability to electrical standards", Metrologia. Institute of Physics Publishing. Bri Stol. GB. vol. 46. No. 5. Oct. 1, 2009 (Oct. 1, 2009). pp. 409-415.

Crovini L et al., "A Precise Variable Level Binary Noise Generator". Alta Frequenza, vol. 44. No. 10, Oct. 1, 1975 (Oct. 1, 1975). pp. 617-621.

Nam, Sae Woo, et al., "Johnson Noise Thermometry Measurements Using a Quantized Voltage Noise Source for Calibration". IEEE Transactions on Instrumentation and Measurement. IEEE Service Center. Piscataway. NJ. US. vol. 52. No. 2. Apr. 1, 2003 (Apr. 1, 2003). pp. 550-554.

Pearce, Jonathan et al., "Towards a practical Johnson noise thermometer for long-term measurements in harsh environments". 2015 4th International Conference on Advancements in Nuclear Instrumentation Measurement Methods and Their Applications (ANI. IEEE. Apr. 20, 2015 (Apr. 20, 2015). pp. 1-4.

White, D.R. et al., "The status of Johnson noise thermometry". Metrologia. Institute of Physics Publishing. Bristol. GB. vol. 1.33. No. 4. Jan. 1, 1996 (Jan. 1, 1996). pp. 325-335.

Johnson, J. B., "Thermal Agitation of Electricity in Conductors", Physical Review, 32, 97, Jul. 1, 1928 (Jul. 1, 1928), pp. 97-109.

Nyquist, H., "Thermal Agitation of Electric Charge in Conductors", Physical Review, 32, Jul. 1, 1928 (Jul. 1, 1928), pp. 110-113.

Bramley, Paul et al., "The Development of a Practical, Drift-Free, Johnson-Noise Thermometer for Industrial Applications", International Journal of Thermophysics, Springer New York LLC, US, vo 1. 38, No. 25, Dec. 14, 2016 (Dec. 14, 2016), pp. 1-15.

Search Report for GB 1521503.1 dated Jun. 2, 2016 (3 pages).

Written Opinion for PCT/EP2016/079104 dated Jan. 12, 2017 (7 pages).

* cited by examiner

TEMPERATURE MEASURING APPARATUS AND A METHOD OF MEASURING TEMPERATURE

CROSS REFERENCE TO RELATED APPLICATIONS

This application is the U.S. National Stage entry under 35 U.S.C. § 371 of International Patent Application No. PCT/EP2016/079104, filed Nov. 29, 2016, and entitled "A Temperature Measuring Apparatus and a Method of Measuring Temperature," which claims priority to GB Application No. 1521503.1 filed Dec. 7, 2015 and entitled "A Temperature Measuring Apparatus and a Method of Measuring Temperature," both of which are incorporated by reference herein in their entireties for all purposes.

STATEMENT REGARDING FEDERALLY SPONSORED RESEARCH OR DEVELOPMENT

Not applicable.

BACKGROUND

The present invention relates to a temperature measuring apparatus and a method of measuring temperature.

SUMMARY OF THE DISCLOSURE

In embodiments, the present invention relates to a temperature measuring apparatus and a method of measuring temperature that determines the temperature of a sensor element by measuring the Johnson noise signal generated by the sensor element.

The accurate measurement of temperature is important in a range of commercial, industrial, and scientific environments. These, for example, include power plants, food storage facilities, aircraft engines, metal processing plants, ceramic manufacturing facilities, semiconductor manufacturing facilities, pharmaceutical manufacturing facilities, hospitals, and scientific research laboratories. In some cases, such as in nuclear power plants and pharmaceutical manufacturing facilities, accurate measurements of temperatures are critical to safety and product quality.

The traditional notion of a temperature measuring apparatus is typically a liquid-in-glass thermometer or a mechanical gauge with a bi-metallic strip. In practice, most thermometers in use are electronic since they offer the ability to automate control or alarm functions and can tolerate a much wider operating range than their traditional counterparts. Electronic thermometers are mainly divided into two categories: thermocouples and resistance temperature detectors. Other types of temperature sensors such as semiconductor sensors are also available for use in specific and limited applications.

The basic principle of a thermocouple thermometer is based on the electromotive force (EMF) generated in a circuit comprising two different metals or metal alloys in which the two junctions between the different metals are at different temperatures. By fixing one junction at a known temperature and provided that the temperature-voltage characteristics are known, the temperature of the other junction can be inferred by measuring the EMF generated in the circuit. In a resistance temperature detector thermometer, the resistance of the sensor element (e.g. a thermistor or a Platinum Resistance Thermometer) of the thermometer varies with temperature. Therefore, provided that the temperature-resistance characteristics of the sensor are known, the temperature of the sensor can be inferred by measuring the resistance of the sensor.

These types of electronic thermometers (thermocouples and resistance temperature detectors) require calibration in order to obtain the temperature-voltage characteristics or the temperature-resistance characteristics. Furthermore, if these types of thermometers are deployed in demanding environments, the physical properties of the sensor element inevitably change with time due to degradation or contamination, meaning that recalibration is often required. For example, in a typical high temperature environment such as a metals processing plant, there may be many metal ions in the vicinity of the sensor element of the thermometer. These may migrate into the sensor material, thereby changing its thermo-electric or resistance properties, leading to the decalibration of the thermometer. Even in less demanding environments, such as in a calibration laboratory, oxidation of the materials, grain growth, mechanical strain, or other factors will cause the physical properties of the sensor material to change, leading to the decalibration of the thermometer.

Although various techniques have been developed to minimise and to mitigate these effects, it had been accepted that the sensor will "drift" (decalibrate) with time and that it is necessary to recalibrate the sensor periodically. It had also been common practice to gradually increase the safe operating margin to accommodate the increasing measurement uncertainty a drifting thermometer provides. For example, in a nuclear power plant, the reactor outlet coolant temperature may be reduced gradually as the plant ages to accommodate less accurate temperature measurements. However, operating at these lower temperatures is clearly undesirable as it reduces the efficiency of the power plant. To circumvent this issue, a technique for determining temperature by measuring thermal electric noise has been developed.

In a conductive medium, such as a resistive sensor element, random electrical noise is generated due to the thermal agitation of the charge carriers (usually electrons) inside the medium. This electrical noise, commonly referred to as Johnson noise, is typically measured as a voltage and is proportional to the temperature of the medium and follows the so-called Johnson-Nyquist equation:

$$\overline{V_T^2} = 4kTR\Delta f \qquad (1)$$

where $\overline{V_T^2}$ is the mean-squared Johnson noise voltage, k is the Boltzmann constant, T is the thermodynamic (absolute) temperature, R is the resistance of the conductive medium, and $\Delta f$ is the measurement bandwidth. Equation 1 therefore shows that the true thermodynamic temperature of the sensor element can be determined directly by measuring the Johnson noise and the resistance of the sensor element. Such a measurement is not affected by changes in the construction of the sensor or any other physical property of the material other than its resistance.

Previous attempts at a "Johnson noise thermometer" have been confined to niche areas such as in metrology experiments aimed at setting and verifying temperature scales. There are two major difficulties with Johnson noise thermometry, the first of which is that the electrical signals generated by Johnson noise are extremely small; typically close to the lower limit of measurement. This is not surprising since the technique involves measuring the electrical signals generated by the thermally-excited random motion of electrical carriers and any electronic equipment used to measure these signals will experience comparable noise signals that are difficult to separate from the Johnson noise to be measured. The Johnson noise signal may also be contaminated by external noise sources such as electromagnetic interference in industrial environments coupling into the measurement system.

The second major difficulty with Johnson noise thermometry is that Equation 1 assumes a perfectly flat frequency response in the measurement bandwidth with infinite out-of-band rejection (i.e. a rectangular function). This is impossible to realise in practice and any approximation with adequate precision is difficult to achieve.

In theory, the difficulty with unwanted noise from the measurement electronics can be addressed by a system such as that shown in FIG. 1. As shown, the system 1 uses two signal amplifiers 2a/2b to measure the voltage signal from the sensor element 3 and uses a correlator 4 to extract the Johnson noise signal. Since the Johnson noise signal measured by the different amplifiers will be correlated and since the noise generated by the different amplifiers will be different and thus not correlated, the desired Johnson noise signal may be extracted from the total noise signal using this correlation technique. The correlation may be performed directly in the time domain or by multiplication in the frequency domain after transforming the signal using Fourier transform algorithms.

The issue of an imperfect frequency response is typically addressed by using a substitution technique such as that shown in FIG. 2. In the system 5 shown in FIG. 2, the amplifiers 6a/6b are alternately switched between measuring the voltage signals from the sensor element 7 and the voltage signals of a reference resistor 8 of known resistance and temperature. The reference resistor enables the calibration of the electronic system used to make the measurements by providing a predetermined signal based on which the resultant output may be measured. The correlator 9 extracts the Johnson noise signal in a manner similar to the correlator 4 shown in FIG. 1. In such an arrangement, the Johnson noise signal from the sensor element and the signal from the reference resistor will both be white noise (i.e. equal spectral density at all frequencies). As such, provided that the frequency response of the system is the same when connected to the sensor element and when connected to the reference resistor, the unknown bandwidth of Equation 1 may be eliminated and the temperature of the sensor element may be determined using the following equation:

$$T = T_{ref} \frac{\overline{V_T^2}}{\overline{V_{ref}^2}} \frac{R_{ref}}{R_T} \qquad (2)$$

where $T_{ref}$ is the known temperature of the reference resistor, $R_{ref}$ is the known resistance of the reference resistor, $V_{ref}^2$ is the measured mean-squared Johnson noise voltage of the reference resistor, RT is the measured resistance of the sensor element, and $V_T^2$ is the measured mean-squared Johnson noise of the sensor element. Equation 2 assumes that the reference resistor is effectively a white noise calibration source with a known power spectral density. This may be replaced by a synthesised noise signal such as a pseudo-random voltage waveform to increase flexibility in the system design. With the reference resistor replaced by a pseudo-random voltage waveform, the temperature of the sensor element may be determined using the following equation:

$$T = \frac{\overline{V_T^2} v_{cal}^2}{4kR_T \overline{V_{cal}^2}} \qquad (3)$$

where $V_{cal}^2$ is the measured mean-squared voltage signal of the pseudo-random voltage waveform and $v_{cal}^2$ is the known noise voltage squared spectral density of the calibration signal.

Equation 2 also assumes that the frequency response of the system is identical when it is connected to the sensor element and the reference resistor. Any mismatch in the frequency response as the system switches between the sensor element and reference resistor will lead to errors. In particular, since Johnson noise signals are small, it is desirable to use wide bandwidths. It is also desirable to use a sensor element and a reference resistor that have large values of resistance. However, these make the measurement system extremely sensitive to any mismatch in the capacitance of the cables used to connect the sensor element and the reference resistor, which then lead to mismatch in the frequency content of the input signal into the amplifiers. To minimise mismatch, the resistance of the sensor element is typically limited to 100Ω and the measurement bandwidth is typically restricted to 100 kHz. A switching or commutation system as shown in FIG. 2 also takes twice the time to make measurements and has the disadvantage of requiring extra components (e.g. switches) in the extremely sensitive input circuit.

Despite limiting the resistance and bandwidth, typical systems often require extremely careful matching of cable capacitances in order to keep the measurement errors to acceptable levels. The need to limit the resistance and bandwidth in order to avoid errors from cable mismatch also means that the Johnson noise signal generated by the sensor element becomes barely detectable above the noise floor of the amplifiers. This then leads to measurement times being extremely long, typically measured in hours or days. This may be acceptable for experimental purposes with large-scale expensive equipment. However, it is impractical for industrial and commercial purposes. There is therefore a need for a faster, drift-free Johnson noise thermometry system.

Accordingly, the first aspect of the present disclosure provides a temperature measuring system, comprising a Johnson noise generating resistive sensor element for detecting temperature; signal processing circuitry electrically coupled to the sensor element; and a current injector electrically coupled to the signal processing circuitry and the sensor element, and configured to inject a calibration current into the sensor element; wherein the signal processing circuitry is configured to: receive a composite voltage signal from the sensor element, the composite voltage signal comprises a voltage signal arising from the Johnson noise generated by the sensor element and a voltage signal arising from the calibration current; extract the Johnson noise voltage signal from the received composite voltage signal; and determine the temperature of the sensor element based on the extracted Johnson noise voltage signal.

The present disclosure therefore provides a system for measuring temperature that requires no switching between measurements of the sensor element and a reference resistor. This provision greatly reduces the measurement time and improves the accuracy of the measurement. The system may then operate at a much higher bandwidth with a sensor element that has a much higher resistance to increase the total signal level.

Preferably, the signal processing circuitry is further configured to extract a measurement of the resistance of the sensor element and to determine the temperature of the sensor element based on the extracted measurement of the resistance.

In embodiments, the current injector is configured to generate a pseudo-random noise current as the calibration current.

In embodiments, the pseudo-random noise current has a form comprising a plurality of harmonically related sine waves with randomised phases.

In embodiments, the signal processing circuitry includes two or more signal amplifiers electrically coupled to the sensor element in parallel, each signal amplifier being configured to receive the composite voltage signal and to output an amplified signal; and a signal correlator configured to receive the amplified signals from the signal amplifiers, process the received amplified signals, and extract an amplified composite voltage signal. Preferably, the current injector is arranged to inject the calibration current from a location proximal to an input of one of the signal amplifiers.

In embodiments, the sensor element has a resistance of 5000 ohms.

In embodiments, the signal processing circuitry is configured to extract the Johnson noise voltage signal and the calibration voltage signal by using a Fourier transform algorithm, wherein the Fourier transform algorithm includes at least one of a fast Fourier transform algorithm and a discrete Fourier transform algorithm. Preferably, the current injector is configured to generate a pseudo-random noise current as the calibration current; the pseudo-random noise current having a form comprising a plurality of harmonically related sine waves with randomised phases and selected frequencies that are each centred in a bin of the Fourier transform algorithm. More preferably, the pseudo-random noise current is predetermined to have frequencies in a subset of the bins of the Fourier transform algorithm.

In embodiments, the signal processing circuitry is configured to receive the composite voltage signal from the sensor element over a bandwidth of 3×106 Hz.

In embodiments, the signal processing circuitry is configured to weight the received composite voltage signal towards frequencies below 1×105 Hz.

In embodiments, the current injector includes a relatively high resistance resistor shielded by a lower resistance structure having the same physical form factor as the high resistance resistor.

In embodiments, the system further comprises a secondary voltage source electrically coupled to the signal processing circuitry and the sensor element, and arranged to apply a secondary voltage signal in series with the sensor element; wherein the composite voltage signal further includes a voltage signal arising from the secondary voltage source; wherein the signal processing circuitry is further configured to extract the voltage signal arising from the secondary voltage source from the received composite voltage signal; and wherein determine the temperature of the sensor element is further based on the extracted secondary voltage signal.

According to another aspect of the present disclosure, there is provided a method of measuring temperature, comprising providing a Johnson noise generating resistive sensor element for detecting temperature; injecting a calibration current into the sensor element; receiving, from the sensor element, a voltage signal arising from the Johnson noise generated by the sensor element and from the calibration current; extracting, from the received voltage signal, a Johnson noise voltage signal arising from the Johnson noise generated by the sensor element; determining the temperature of the sensor element based on the extracted Johnson noise voltage signal.

Preferably, the method further comprises extracting a measurement of the resistance of the sensor element, wherein determining the temperature of the sensor element is further based on the extracted measurement of the resistance.

In embodiments, injecting a calibration current includes injecting a pseudo-random noise current. Preferably, the pseudo-random noise current has a form comprising a plurality of harmonically related sine waves with randomised phases.

In embodiments, receiving a composite voltage signal comprises dividing the composite voltage signal into a plurality of pathways; amplifying each pathway; and processing the amplified pathways using correlation techniques to extract an amplified composite voltage signal.

In embodiments, extracting a Johnson noise voltage signal and extracting a calibration voltage signal comprise using a Fourier transform algorithm, wherein the Fourier transform algorithm includes at least one of a fast Fourier transform algorithm and a discrete Fourier transform algorithm. Preferably, injecting a calibration current includes injecting a pseudo-random noise current, the pseudo-random noise current having a form comprising a plurality of harmonically related sine waves with randomised phases and selected frequencies that are each centred in a bin of the Fourier transform algorithm. More preferably, the method further comprises predetermining the pseudo-random noise current to have frequencies in a subset of the bins of the Fourier transform algorithm.

In embodiments, receiving a composite voltage signal comprises receiving voltage signal from the sensor element over a bandwidth of 3×106 Hz.

In embodiments, the method further comprises weighting the received composite voltage signal towards frequencies below 1×105 Hz.

In embodiments, the method further comprises applying a secondary voltage in series with the sensor element, wherein the composite voltage signal further includes a voltage signal arising from the secondary voltage; and extracting, from the received composite voltage signal, a secondary voltage signal arising from the applied secondary voltage; wherein determining the temperature of the sensor element is further based on the extracted secondary voltage signal According to yet another aspect, there is provided a temperature measuring system, comprising a Johnson noise generating resistive sensor element for detecting temperature; signal processing circuitry electrically coupled to the sensor element; and a secondary voltage source electrically coupled to the signal processing circuitry and the sensor element, and arranged to apply a secondary voltage in series with the sensor element; wherein the signal processing circuitry is configured to receive a composite voltage signal from the sensor element, the composite voltage signal including a voltage signal arising from the Johnson noise generated by the sensor element and a voltage signal arising from the secondary voltage; extract the Johnson noise voltage signal and the secondary voltage signal from the received composite voltage signal; and determine the temperature of the sensor element based on the extracted Johnson noise voltage signal and on the extracted secondary voltage signal.

BRIEF DESCRIPTION OF THE DRAWINGS

Exemplary embodiments of the present disclosure will hereinafter be described by way of examples, with references to the accompanying drawings, in which.

DESCRIPTION OF EXEMPLARY EMBODIMENTS OF THE DISCLOSURE

Exemplary embodiments of a temperature measuring system broadly include a sensor element formed from a conductive material that has an electrical resistance. The conductive material of the sensor element naturally generates Johnson noise in the form of a voltage signal, which the temperature measuring system measures in order to determine the temperature of the sensor element. The system also includes signal processing circuitry that is electrically coupled to the sensor element. The system further includes a current injector, which is electrically coupled to both the sensor element and the signal processing circuitry. The current injector is configured to inject a calibration current into the sensor element, which combines with the naturally generated Johnson noise in the sensor element to generate a composite voltage signal. The signal processing circuitry is configured to receive the composite voltage signal (i.e. a signal comprising a voltage signal arising from the Johnson noise of the sensor element combined with a voltage signal arising from the calibration current). The signal processing circuitry is further configured to extract the Johnson noise voltage signal and the calibration voltage signal from the composite signal and to determine the temperature of the sensor element based on the extracted Johnson noise voltage signal and on the extracted calibration voltage signal.

Figure 1:
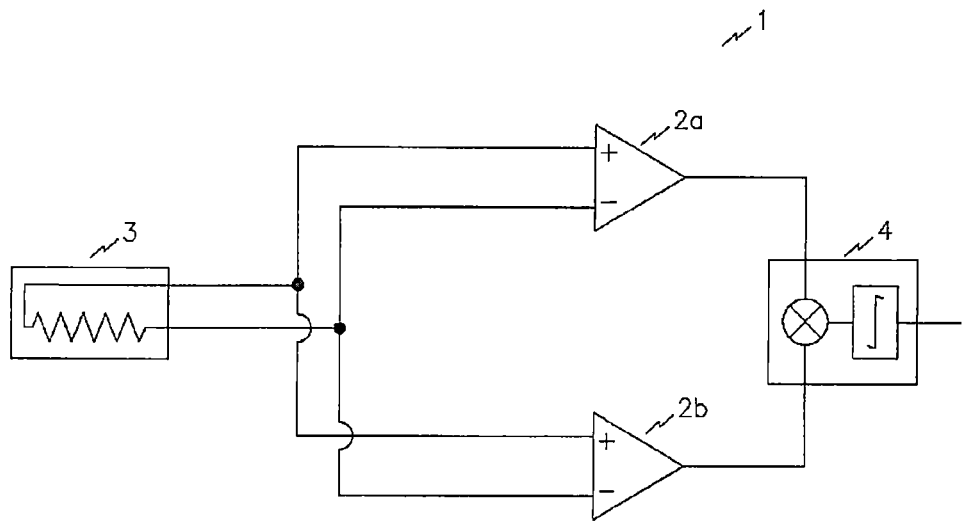
FIG. 1 is a circuit diagram illustrating a known temperature measuring system.
Figure 2:
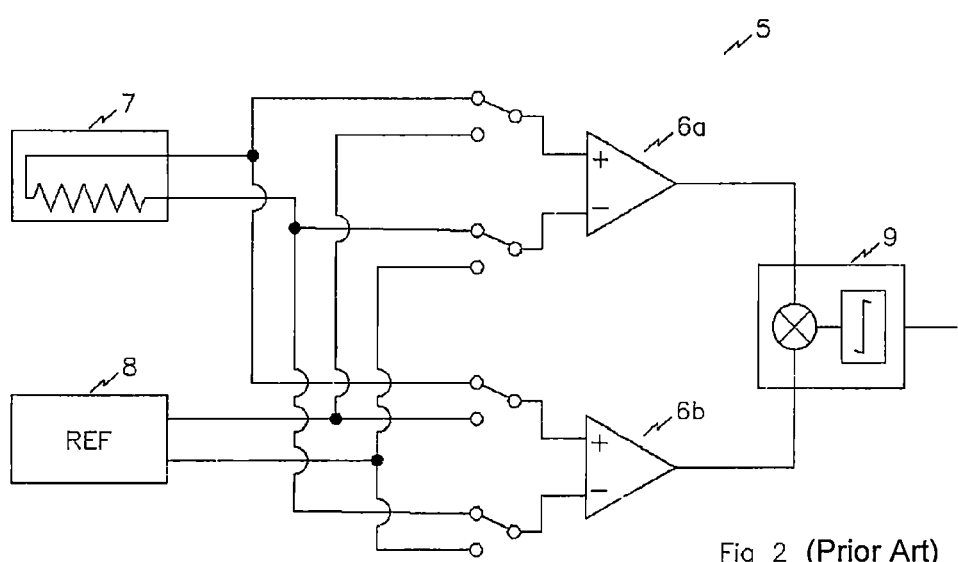
FIG. 2 is a circuit diagram illustrating another known temperature measuring system.
Figure 3:
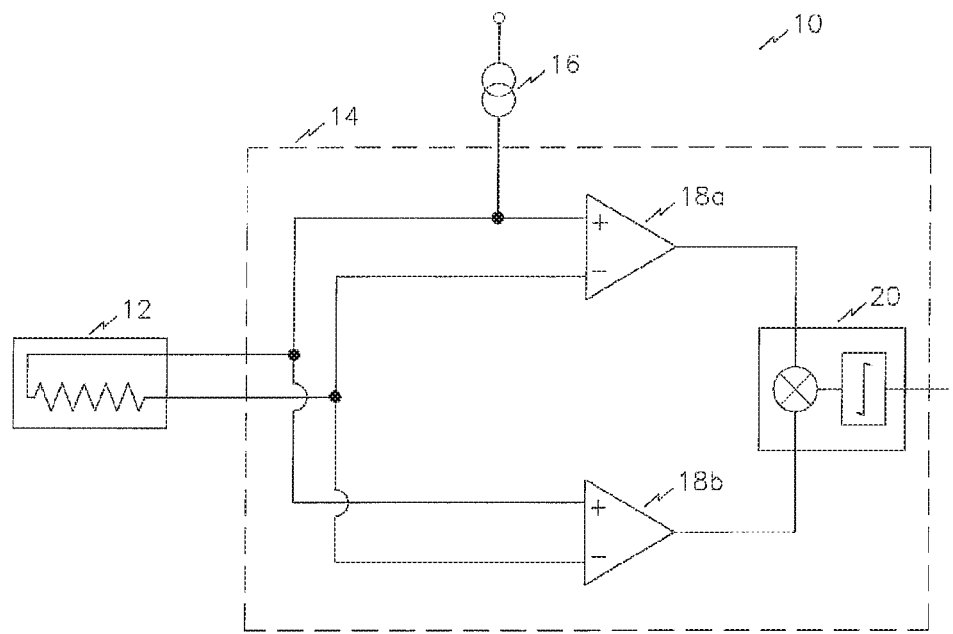
FIG. 3 is a circuit diagram illustrating an example of a temperature measuring system.

An embodiment of a temperature measuring system 10 is shown in FIG. 3. In this embodiment, the system 10 includes a sensor element 12, signal processing circuitry 14, and a current injector 16. In examples of this embodiment, the sensor element 12 is formed from a metallic resistive material that generates Johnson noise signals naturally such as, but not limited to, a platinum resistance thermometer. In other examples, the sensor element 12 may be formed from any other suitable material that generates Johnson noise signals naturally. The signal processing circuitry 14 includes two signal amplifiers 18a/18b and a signal processor 20. The signal processor 20 optionally includes one or more signal correlators. The signal amplifiers 18a/18b and the signal processor 20 each has two inputs and one output. The inputs of each of the signal amplifiers 18a/18b are electrically coupled to the sensor element 12 and the outputs of the signal amplifiers 18a/18b are coupled electrically to the respective inputs of the signal processor 20. In some embodiments, the sensor element 12 and the signal amplifiers 18a/18b are connected in parallel.

The current injector 16 of the embodiment of FIG. 3 is electrically coupled to the sensor element 12 so as to enable a calibration current to be injected into the sensor element 12. For example, in some arrangements of this embodiment, the sensor element 12 and the various components of the signal processing circuitry 14 are interconnected by electrical cables and the current injector 16 is arranged to inject the calibration current into the electrical cable that connects the sensor element 12 to an input of one of the signal amplifiers 18a/18b. In other arrangements, the sensor element 12 and the various components of the signal processing circuitry 14 are interconnected by other suitable means of electrical connection and the current injector 16 is arranged to inject the calibration current into the electrical connection between the sensor element 12 and an input of one of the signal amplifiers 18a/18b. The calibration current is of a known form and may be predetermined by an operator of the system 10.

The sensor element 12 generates a voltage signal due to the naturally generated Johnson noise. The Johnson noise voltage signal is dependent on the temperature of the sensor element 12, and is higher when the temperature of the sensor element 12 is high, lower when the temperature of the sensor element is low. When the current injector 16 injects the calibration current into the sensor element 12, the calibration current combines with the Johnson noise of the sensor element 12 to generate a composite voltage signal across the sensor element 12. The composite voltage signal may comprise the naturally generated Johnson noise voltage signal and the signal arising from the calibration current, and the frequency ranges used in the measurement may have the same frequency spectrum as the Johnson noise voltage signal of the sensor element 12 in the absence of the calibration current. In some examples of the embodiment shown in FIG. 3, the calibration current is a pseudo-random noise (PRN) current. In particular examples, the PRN current has a form that comprises a plurality of harmonically related sine waves with randomised phases. In some examples of this embodiment, the calibration current is injected directly into the sensor element 12. In other examples, the current injector 16 is arranged to inject the calibration current at a location proximal to the input of a signal amplifier 18a/18b, i.e. physically close to the input. This latter arrangement is preferable when, for example, the sensor element 12 is placed in a physical location that is difficult or impossible to access for the purpose of injecting the calibration current.

By injecting a calibration current into the sensor element 12, the system 10 does not require any commutation to switch between measuring the voltage signal of the sensor element 12 and measuring the voltage signal of a reference resistor. This then eliminates the requirement for close-matching of the time constants of the different circuits in order to reduce errors caused by imperfectly matched frequency responses, thereby enabling the use of wider measurement bandwidths and/or higher resistance sensor elements to generate larger signals. The voltage signal arising from the calibration current may also be used to characterize the frequency response of the system 10.

In arrangements in which the calibration current is injected into the sensor element 12 at a location proximal to the input of a signal amplifier 18a/18b, the signals received by the signal amplifiers 18a/18b will differ due to signal attenuation in the electrical cables connecting the sensor to the signal amplifiers and the asymmetry in the system 10. In the example shown in FIG. 3, the calibration current is injected near an input of the signal amplifier 18a, causing the signal received by signal amplifier 18a to read higher than the signal received by signal amplifier 18b. The magnitude of the excess signal at signal amplifier 18a is comparable to the signal shortfall at signal amplifier 18b when these are compared with the ideal situation of injecting the current directly into the sensor element 12. This leads to a first order cancellation of the errors, which improves with increasing resistance of the sensor element 12. Accordingly, the error caused by attenuation and system asymmetry may be reduced to acceptable levels by selecting a sensor element 12 that has a high resistance. In examples, a sensor element 12 with a resistance of 5000Ω is used. At a bandwidth of 1 MHz, this provides a 500 fold increase in the signal level as compared to a 100Ω sensor element at 100 kHz bandwidth.

In the above-described embodiments and as shown in FIG. 3, two signal amplifiers 18a/18b are provided. However, it will be appreciated by the skilled person that the signal processing circuitry 14 may have more than two signal amplifiers and that the signal processor 20 may include more than one signal correlators suitably connected to the signal amplifiers.

To determine the temperature of the sensor element 12, the signal processing circuitry 14 receives the composite voltage signal from the sensor element 12, extracts the Johnson noise voltage signal and the calibration voltage signal using a correlation technique, and determines the temperature of the sensor element 12 based on Equation 3. More specifically, the composite voltage signal is divided into a number of electrical pathways, each received at the inputs of each of the signal amplifiers 18a/18b. Each signal amplifier 18a/18b amplifies the voltage signal it receives to a level that is more practical for signal processing and outputs the amplified signal to the signal processor 20. The signal processor 20 receives and compares the two amplified voltage signals, and identifies components that are common to both received amplified signals. Components that are not common are attributed to uncorrelated random noise generated by the signal amplifiers 18a/18b and are rejected. Components that are common are attributed to the composite voltage signal generated across the sensor element 12. Based on these common components, the signal processor 20 extracts an amplified composite voltage signal. Additionally, based on the known form of the calibration current, the signal processor 20 separates the components of the composite voltage signal attributed to the calibration current and components attributed to the Johnson noise of the sensor element 12. In some examples of the embodiment shown in FIG. 3, the signal processor 20 performs calculations based on the components attributed to the Johnson noise of the sensor element 12 to infer the temperature of the sensor element 12.

Optionally, the signal processing circuitry 14 also extracts the calibration voltage signal from the received composite voltage signal and determines the temperature of the sensor element 12 based on the extracted Johnson noise voltage signal and the extracted calibration voltage signal.

Figure 4:
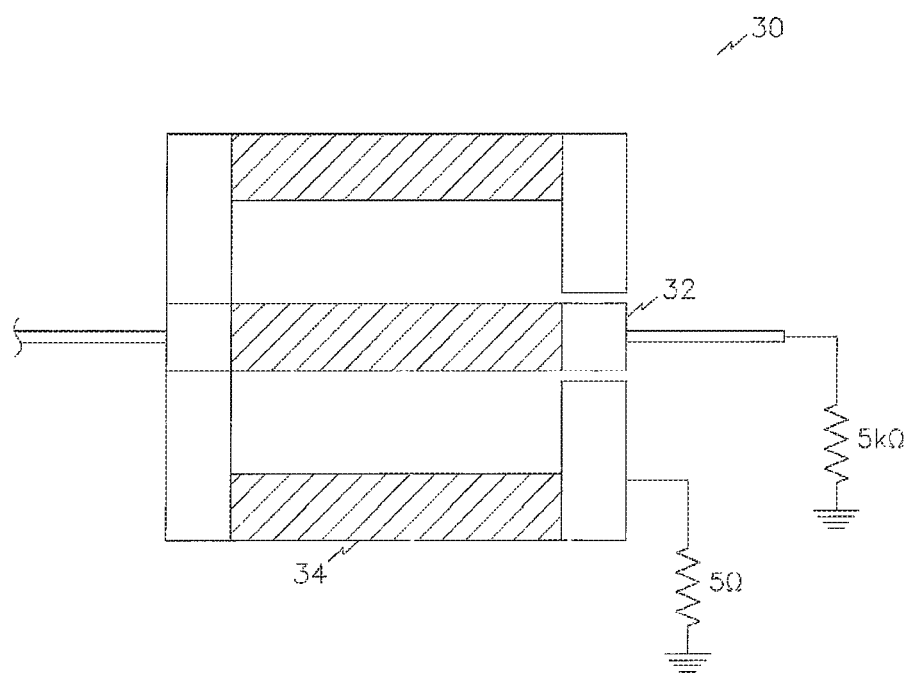
FIG. 4 is a circuit diagram illustrating an example of a resistor assembly for a current injector.

In examples of the embodiments of the system 10, the current injector 16 includes a resistor assembly 30 that has a high resistance and low stray capacitance. As shown in FIG. 4, the resistor assembly 30 comprises a high resistance resistor 32 surrounded by a lower resistance structure 34 connected to similar voltages to guard the high resistance resistor. Such an arrangement of a lower resistance guard around the high resistance resistor ensures that the electric field around the shielded resistor is the same or similar to one that is in infinite space and shields the high resistance resistor from any conductor that may be in its vicinity. In particular, the shielding prevents any capacitive current flowing to ground, which would divert some of the intended calibration current away from the sensor element 12. The capacitive imperfections in the high resistance resistor 32 are then limited to end-to-end capacitance arising from the construction of the resistor, which may be kept low by keeping the ends of the resistor separated. In the example shown in FIG. 4, the lower resistance structure 34 is cylindrical in shape and has a resistance of 5 kΩ. The high resistance resistor 32 has a resistance of 5MΩ and has a capacitance low enough to achieve a bandwidth exceeding 1 MHz.

Figure 5:
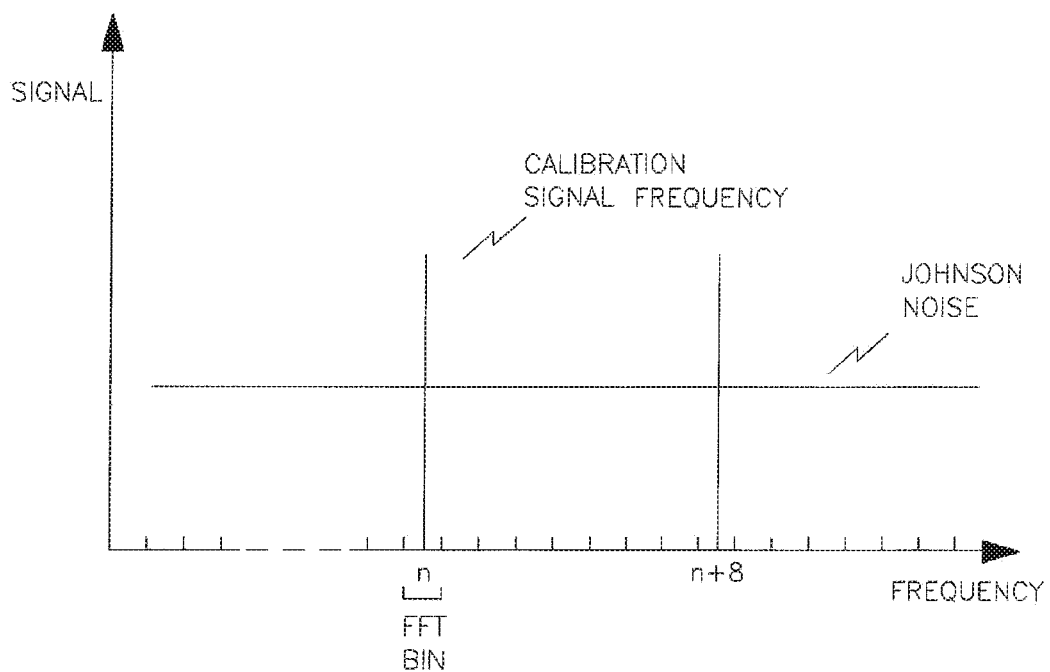
FIG. 5 is a graph illustrating the frequency components of a calibration signal.

In examples of the embodiment of the system 10, the signal processor 20 is configured to compare the two amplified voltage signals received from the signal amplifiers 18a/18b using a Fourier transform algorithm. The Fourier transform algorithm includes, but is not limited to, a fast Fourier transform algorithm or a discrete Fourier transform algorithm. The outputs of the signal amplifiers 18a/18b are multiplied together and then summed to determine the mean-squared value of the correlated component of the two amplified voltage signals. In some of these examples, the current injector 16 is configured to inject a PRN current as the calibration current. The PRN has a form that comprises a number of harmonically related sine waves with randomised phases. The frequencies of the sine waves are selected such that they are each centred in a bin of the Fourier transform algorithm so as to ensure no leakage into adjacent bins. In some examples, the PRN current is predetermined to have frequencies in a subset of the bins of the Fourier transform algorithm. In a particular example, the PRN current is predetermined to have frequencies in every eighth bin. FIG. 5 shows one such particular example, in which one frequency component of the Fourier transform of the calibration signal is in bin "n" and the next frequency component is in bin "n+8".

The Johnson noise voltage signal may be determined by using only bins that do not contain any of the selected frequencies. The calibration signal may be determined by using only those bins that do contain the selected frequencies and subtracting, in quadrature, the previously determined Johnson noise voltage signal.

In some embodiments, in addition or as an alternative to the current injector 16, the system 10 includes a secondary voltage source (not shown) that is electrically coupled to the sensor element 12 and the signal processing circuitry 14. The secondary voltage source is arranged to apply a secondary voltage in series with the sensor element 12. The use of such a secondary voltage obviates the need for the sensitivity of the measurement system to be stable over time. In examples, the secondary voltage source is configured to apply a pseudo-random noise (PRN) voltage. In particular examples, the PRN voltage comprises a plurality of harmonically related sine waves with randomised phase. The sine waves are preferably in a different subset of Fourier transform bins to those occupied by the calibration current signal so that the voltage signal arising from the secondary voltage source can be extracted from the other signals in the composite voltage signal using the same signal processing method used to separate the voltage signal arising from the calibration current from the Johnson noise voltage signal. As well as being used to calibrate the sensitivity of the system 10 in order to allow the resistance of the sensor element 12 to be determined using Ohm's law, this secondary voltage signal can also be used to characterize the frequency response of the measurement electronics and therefore to contribute to the calculation of temperature from the captured data.

Typically, due to the frequency response of the sensor element 12 in combination with the capacitance of the electrical cables, the majority of the signal reaching the signal amplifiers 18a/18b occurs at lower frequencies, such as below 100 kHz, and most of the aforementioned errors occur at frequencies above 100 kHz. Accordingly, in embodiments of the system 10, the signal processing circuitry 14 is configured to apply a weighting to the bins in the Fourier transform algorithm that contain the total signal appearing in each frequency interval. This weighting is in proportion to the expected or measured amplitude when performing the aforementioned calculations. In particular, in some examples, the signal processor 20 is configured to apply this weighting.

In examples of the embodiments of the system 10, the resistance of the sensor element 12 is determine by including lower frequencies in the calibration current signal where the gain of the system is calculable and stable. These lower frequencies may be below those used for the Johnson noise determination. These frequencies are then extracted from the FFT information and used to determine the resistance using Ohm's law. In the particular examples in which the calibration current signal is a PRN comprising a number of harmonically related sine waves with randomised phases, the inclusion of these lower frequencies where the gain is stable and known enables the resulting voltage to be measured and enables the resistance of the sensor element 12 to be determined using Ohm's law.

The embodiments of system 10 may be deployed in a variety of ways. In some examples, the sensor element 12 may be positioned in a space or adjacent an object to measure the temperature thereof. The space or object may be at extreme temperatures and/or be subject to high levels of radiation. The signal processing circuitry 14 and the current injector 16 may then be located remotely, away from the space or object. In such an arrangement, the more delicate components of the system 10 are protected from heat/cold or radiation damage Embodiments of the present disclosure have been described with particular reference to the examples illustrated. However, it will be appreciated that variations and modifications may be made to the examples described within the scope of the appending claims.

The invention claimed is:

1. A temperature measuring system, comprising:
a Johnson noise generating resistive sensor element for detecting temperature;
signal processing circuitry electrically coupled to the sensor element; and
a current injector electrically coupled to the signal processing circuitry and the sensor element, and configured to inject a calibration current into the sensor element;
wherein the signal processing circuitry is configured to:
receive a composite voltage signal from the sensor element, the composite voltage signal including a voltage signal arising from the Johnson noise generated by the sensor element and a voltage signal arising from the calibration current;
extract the Johnson noise voltage signal and the calibration voltage signal from the received composite voltage signal; and
determine the temperature of the sensor element based on the extracted Johnson noise voltage signal and on the extracted calibration voltage signal.

2. A system as claimed in claim 1, wherein the signal processing circuitry is further configured to:
extract a measurement of the resistance of the sensor element; and
determine the temperature of the sensor element based on the extracted measurement of the resistance.

3. A system as claimed in claim 1, wherein the signal processing circuitry is configured to weight the received composite voltage signal towards frequencies below $1\times10^5$ Hz.

4. A system as claimed in claim 1, wherein the current injector includes a relatively high resistance resistor shielded by a lower resistance structure having a similar physical form factor as the high resistance resistor.

5. A system as claimed in claim 1, wherein the current injector is configured to generate a pseudo-random noise current as the calibration current.

6. A system as claimed in claim 5, wherein the pseudo-random noise current has a form comprising a plurality of harmonically related sine waves with randomised phases.

7. A system as claimed in claim 1, further comprising a voltage source electrically coupled to the signal processing circuitry and the sensor element, and arranged to apply a secondary voltage in series with the sensor element;
wherein the composite voltage signal further includes a voltage signal arising from the secondary voltage;
wherein the signal processing circuitry is further configured to extract the voltage signal arising from the voltage source from the received composite voltage signal; and
wherein determining the temperature of the sensor element is further based on the extracted secondary voltage signal.

8. A system as claimed in claim 1, wherein the signal processing circuitry includes:
two or more signal amplifiers electrically coupled to the sensor element in parallel, each signal amplifier being configured to receive the composite voltage signal and to output an amplified signal; and
a signal correlator configured to receive the amplified signals from the signal amplifiers, process the received amplified signals, and extract an amplified composite voltage signal.

9. A system as claimed in claim 8, wherein the current injector is arranged to inject the calibration current from a location proximal to an input of one of the signal amplifiers.

10. A system as claimed in claim 1, wherein the signal processing circuitry is configured to extract the Johnson noise voltage signal and the calibration voltage signal by using a Fourier transform algorithm, wherein the Fourier transform algorithm includes at least one of a fast Fourier transform algorithm and a discrete Fourier transform algorithm.

11. A system as claimed in claim 10, wherein the current injector is configured to generate a pseudo-random noise current as the calibration current; the pseudo-random noise current having a form comprising a plurality of harmonically related sine waves with randomised phases and selected frequencies that are each centred in a bin of the Fourier transform algorithm.

12. A system as claimed in claim 11, wherein the pseudo-random noise current is predetermined to have frequencies in a subset of the bins of the Fourier transform algorithm.

13. A method of measuring temperature, comprising:

providing a Johnson noise generating resistive sensor element for detecting temperature;
injecting a calibration current into the sensor element;
receiving, from the sensor element, a composite voltage signal arising from the Johnson noise generated by the sensor element and arising from the calibration current;
extracting, from the received composite voltage signal, a Johnson noise voltage signal arising from the Johnson noise generated by the sensor element;
extracting, from the received composite voltage signal, a calibration voltage signal arising from the calibration current; and
determining the temperature of the sensor element based on the extracted Johnson noise voltage signal and on the extracted calibration voltage signal.

14. A method as claimed in claim 13, further comprising extracting a measurement of the resistance of the sensor element, wherein determining the temperature of the sensor element is further based on the extracted measurement of the resistance.

15. A method as claimed in claim 13, wherein receiving a composite voltage signal comprises:
dividing the composite voltage signal into a plurality of pathways;
amplifying each pathway; and
processing the amplified pathways using correlation techniques to extract an amplified composite voltage signal.

16. A method as claimed in claim 13, further comprising:
applying a secondary voltage in series with the sensor element, wherein the composite voltage signal further includes a voltage signal arising from the secondary voltage; and
extracting, from the received composite voltage signal, a secondary voltage signal arising from the applied secondary voltage;
wherein determining the temperature of the sensor element is further based on the extracted secondary voltage signal.

17. A method as claimed in claim 13, wherein injecting a calibration current includes injecting a pseudo-random noise current.

18. A method as claimed in claim 17, wherein the pseudo-random noise current has a form comprising a plurality of harmonically related sine waves with randomised phases.

19. A method as claimed in claim 13, wherein extracting a Johnson noise voltage signal and extracting a calibration voltage signal comprise using a Fourier transform algorithm, wherein the Fourier transform algorithm includes at least one of a fast Fourier transform algorithm and a discrete Fourier transform algorithm.

20. A method as claimed in claim 19, wherein injecting a calibration current includes injecting a pseudo-random noise current, the pseudo-random noise current having a form comprising a plurality of harmonically related sine waves with randomised phases and selected frequencies that are each centred in a bin of the Fourier transform algorithm.

21. A method as claimed in claim 20, further comprising predetermining the pseudo-random noise current to have frequencies in a subset of the bins of the Fourier transform algorithm.

\* \* \* \* \*